R. HATHAWAY.
FAUCET.
No. 191,852. Patented June 12, 1877.
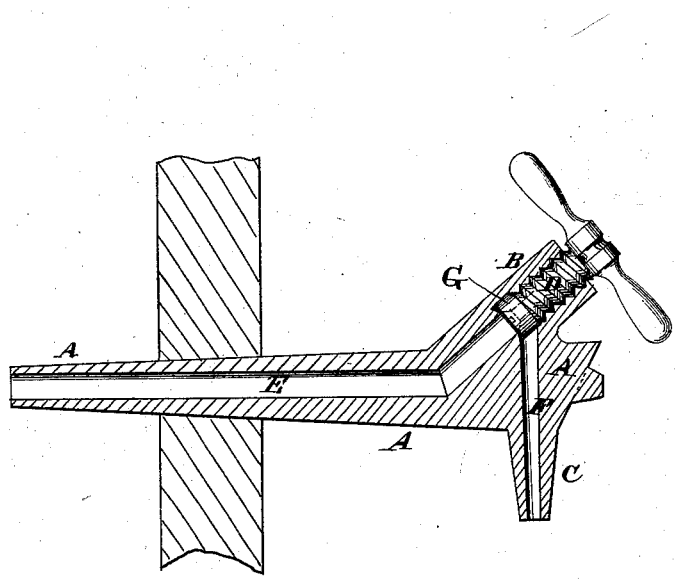
WITNESSES:
INVENTOR:
R. Hathaway
BY
ATTORNEYS.

UNITED STATES PATENT OFFICE.

RALPH HATHAWAY, OF MEMPHIS, TENNESSEE.

IMPROVEMENT IN FAUCETS.

Specification forming part of Letters Patent No. 191,852, dated June 12, 1877; application filed April 2, 1877.

*To all whom it may concern:*

Be it known that I, RALPH HATHAWAY, of Memphis, in the county of Shelby and State of Tennessee, have invented a new and useful Improvement in Faucets, of which the following is a specification:

The figure is a longitudinal section of my improved faucet.

The object of this invention is to furnish an improved faucet, which shall be so constructed as to wholly prevent leakage, and will enable the valve-packing to be readily renewed should it become worn.

The invention will first be described in connection with the drawing, and then pointed out in the claim.

A represents the receiving-tube; B, the key-seat; and C the discharge-pipe.

The passage E through the receiving-tube near the outer end of the faucet is inclined upward at an angle of forty-five degrees, as shown in the figure, so as to meet the lower end of the key D squarely, and the passage F of the discharge-pipe C passes down vertically and enters the cavity of the key-seat B at an angle of forty-five degrees, and just above the vent of the passage E.

The key D screws into its seat, and has a rubber button or packing, G, secured detachably to its forward end by a small screw, as shown in the figure. The rubber button G is more durable than the packings usually employed in faucets, and, being more compressible, it makes a tighter joint.

The rubber button G is unaffected by the liquor, and will, consequently, last almost as long as the metal parts of the faucet; but, should it become worn or frayed by use, it can readily be detached by removing the small screw, and replaced by a new one.

Having thus described my invention, I claim as new and desire to secure by Letters Patent—

A faucet for barrels and vessels, containing liquids, consisting of the tube A B, having obtuse-angled channel E, the perpendicular channel F, and the rubber valve on end of screw, all as shown and described.

RALPH HATHAWAY.

Witnesses:
PAUL J. DUNN,
JOHN A. ONLEY.